July 10, 1956     A. H. DICKINSON     2,754,502
DATA PROCESSING MACHINE
Filed Dec. 31, 1954     8 Sheets-Sheet 8

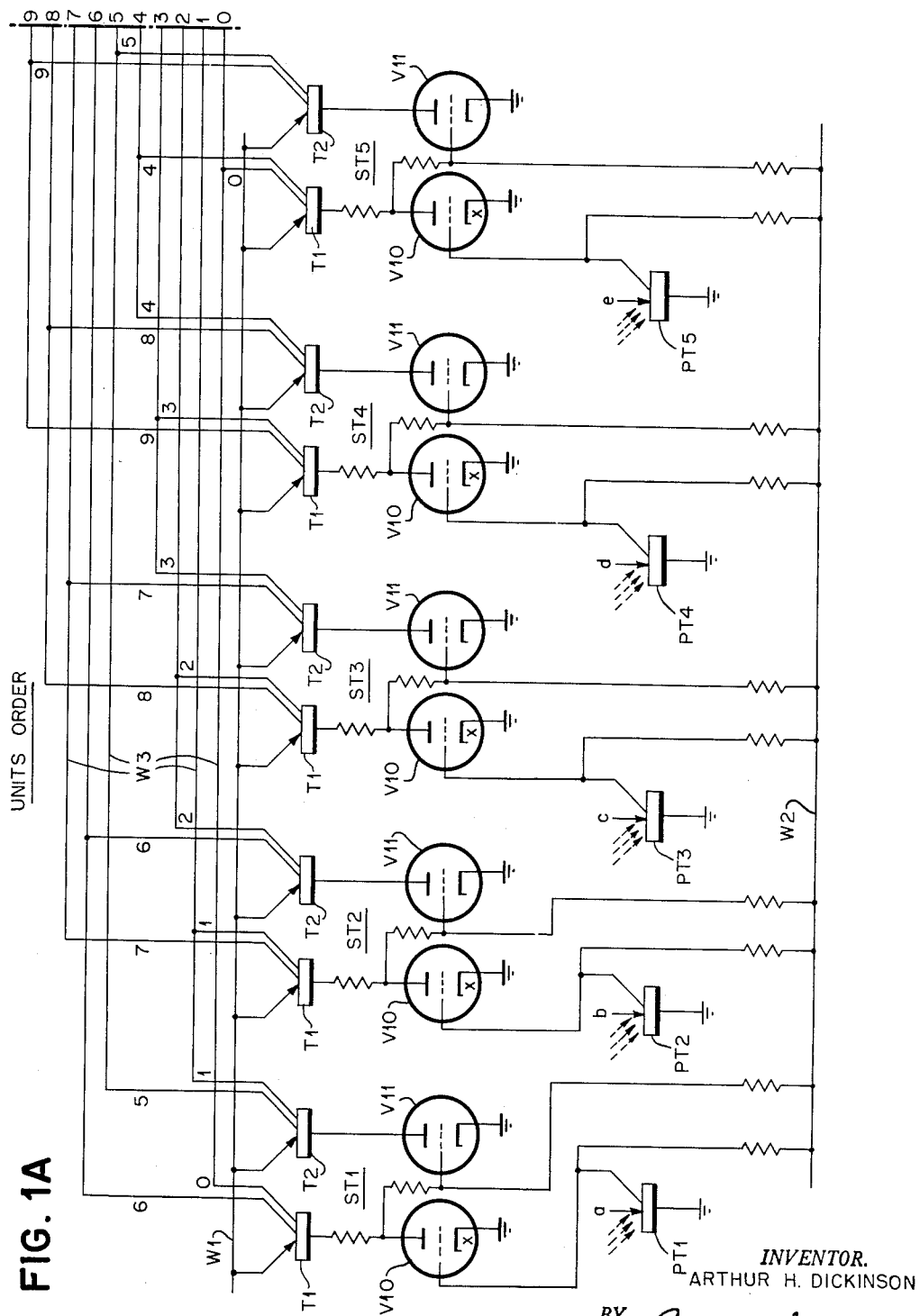

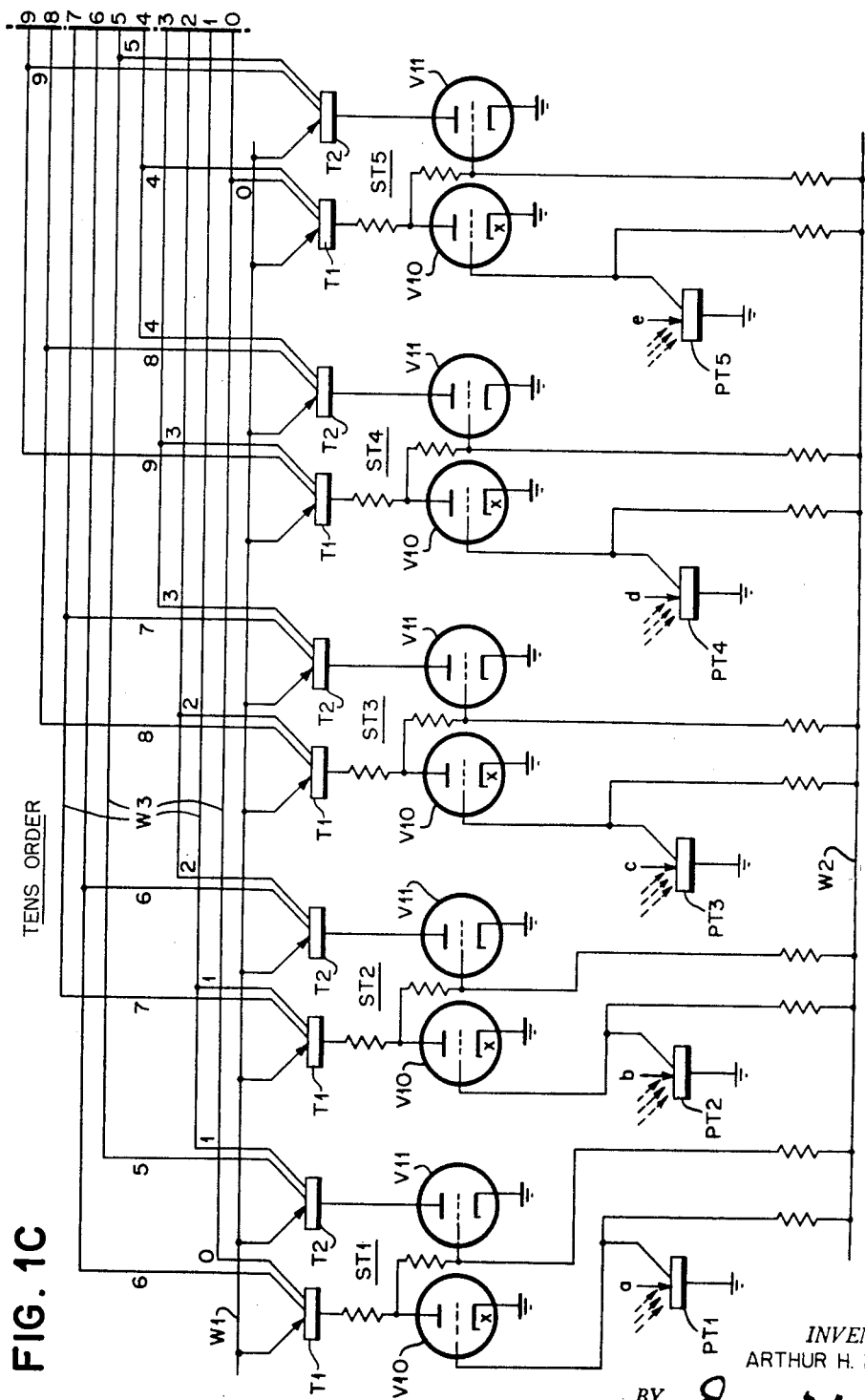

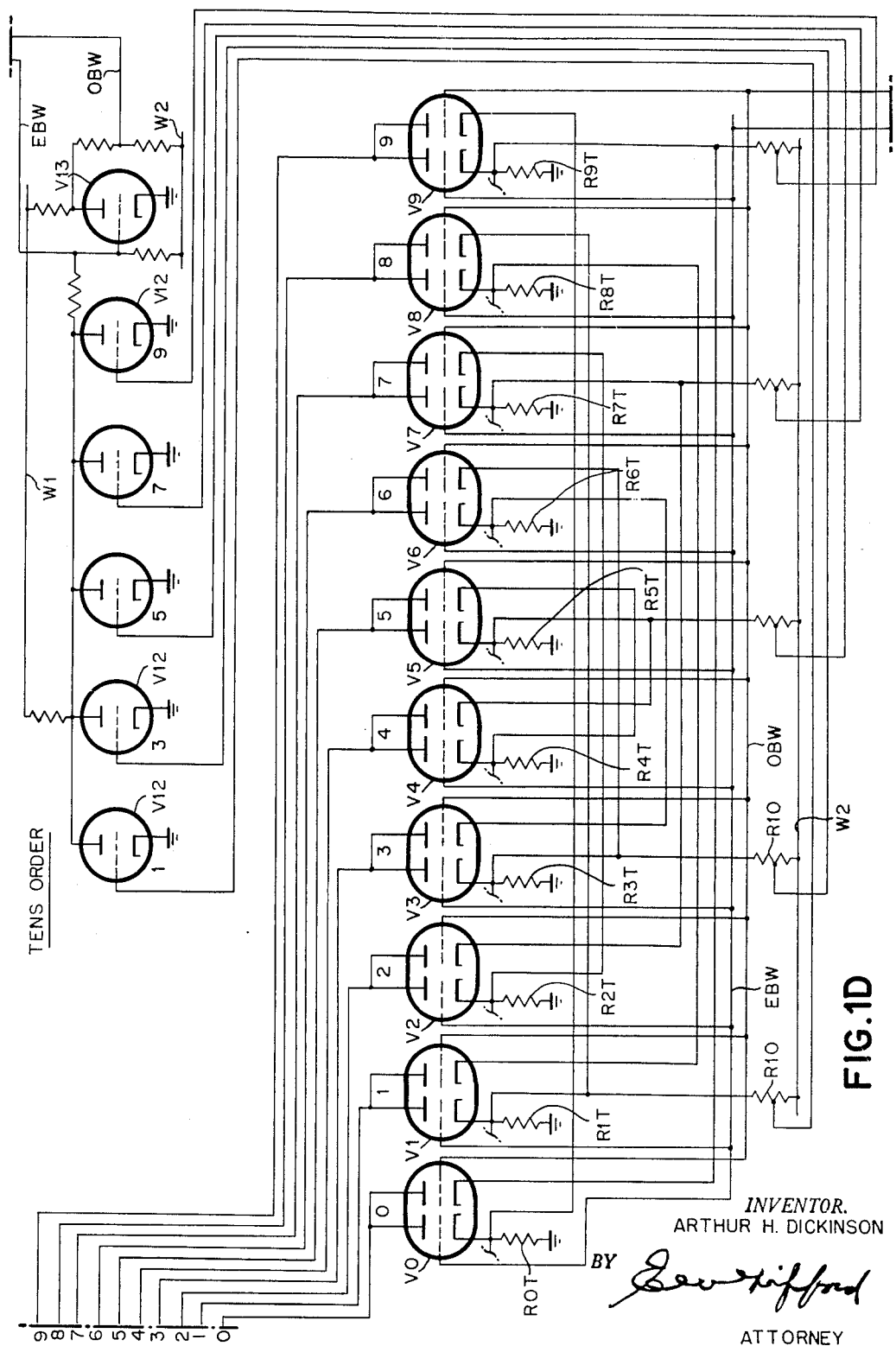

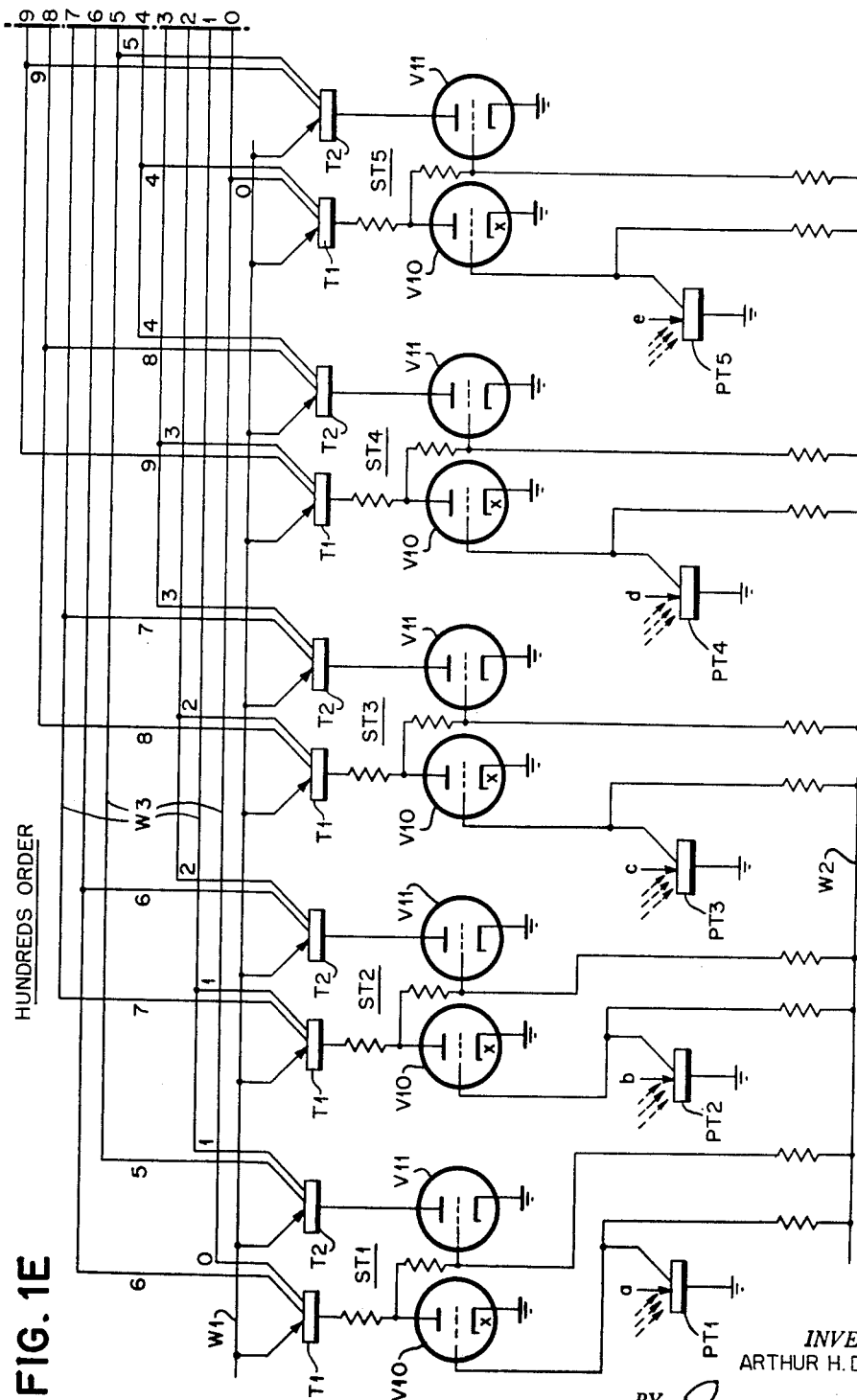

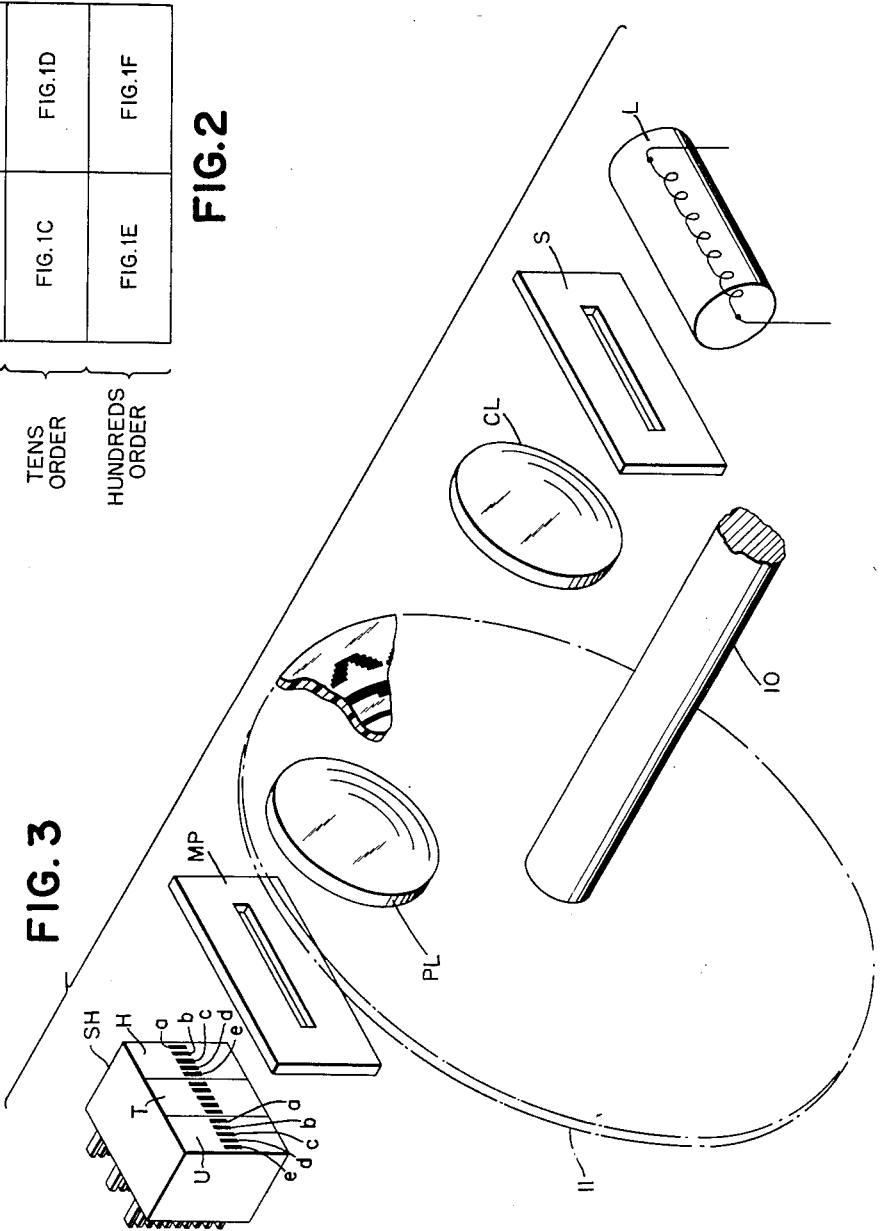

INVENTOR.
ARTHUR H. DICKINSON
BY
ATTORNEY

United States Patent Office 2,754,502
Patented July 10, 1956

2,754,502

DATA PROCESSING MACHINE

Arthur H. Dickinson, Greenwich, Conn., assignor to International Business Machines Corporation, New York, N. Y., a corporation of New York Application December 31, 1954, Serial No. 479,202

13 Claims. (Cl. 340—347)

This invention relates to measuring and computing machines in general, and in particular to those known as analog computers.

The broad object of the invention is to provide a means of converting displacements of physical objects into a digital representation of the extent of displacement.

An object is to provide an analog-to-digital conversion means which takes a physically displaceable element, either linear or rotary, and converts it to a digital representation of displacement according to some scale of values which may be used for purposes of calculation.

An object is to provide an analog-to-digital conversion means in which anomalous or ambiguous representations are avoided.

An object is to provide an analog-to-digital conversion means which operates in accordance with a shifting code.

An object is to provide an analog-to-digital conversion means which is electronic in its character and includes an electronic digital register for the reception of the converted data.

An object is to provide an analog-to-digital conversion means which includes sensory elements which detect the total physical displacement of an object without imposing any load upon the displaced object.

An object is to provide a photo-optical means of sensing the displacement of physically displaceable elements of instruments such as meter hands and other indicating devices which cannot be loaded by a physical measuring means without affecting the accuracy of the instrument.

It is a specific object of the invention to provide a means of measuring displacement which employs phototransistors.

An object is to provide an analog-to-digital conversion means in which the transitional changes through different digital positions are accompanied by only a single change in the sensory device for the purpose of avoiding anomalous or ambiguous indications.

There has always existed the problem of converting to a decimal digital representation the displacements of indicating media, such as meter dials, float gauges, and other devices or instruments which cannot be loaded with any type of displacement detecting and measuring means without affecting their accuracy. It is quite common in various types of equipment to sense or measure values indicated on meters, float gauges and other similar devices, and use the results in calculation on a digital basis, and many forms of analog computers utilize engineering data derived from measuring devices of this nature. As is well known in the art of measuring devices, there are many instruments for converting total displacements to digital values, and one of the most common forms comprises gear trains arranged on a 1 to 10 basis for the purpose of decimally digitally measuring the values. A good illustration is the dial on a watthour meter which has hands or dials geared on a 1 to 10 ratio to digitally represent the integrations of the meter. It is well known that there are various types of combinations of dial positions, particularly in the region of multiple carries, where it is exceedingly difficult to ascertain the true indication of the meter. The present invention has for one of its objects to correct this difficulty by providing a measuring and digital conversion device which accurately converts transitions involving multiple carries into a true digital representation on a register of the actual measured value and without imposing any mechanical reaction or load upon the measuring device.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1A to 1F comprise a wiring diagram.

Fig. 2 is a diagram showing how Figs. 1A to 1F may be arranged to form a single wiring diagram.

Fig. 3 is a diagrammatic view showing the arrangement of the phototransistor displacement sensing means.

Figure 1B:
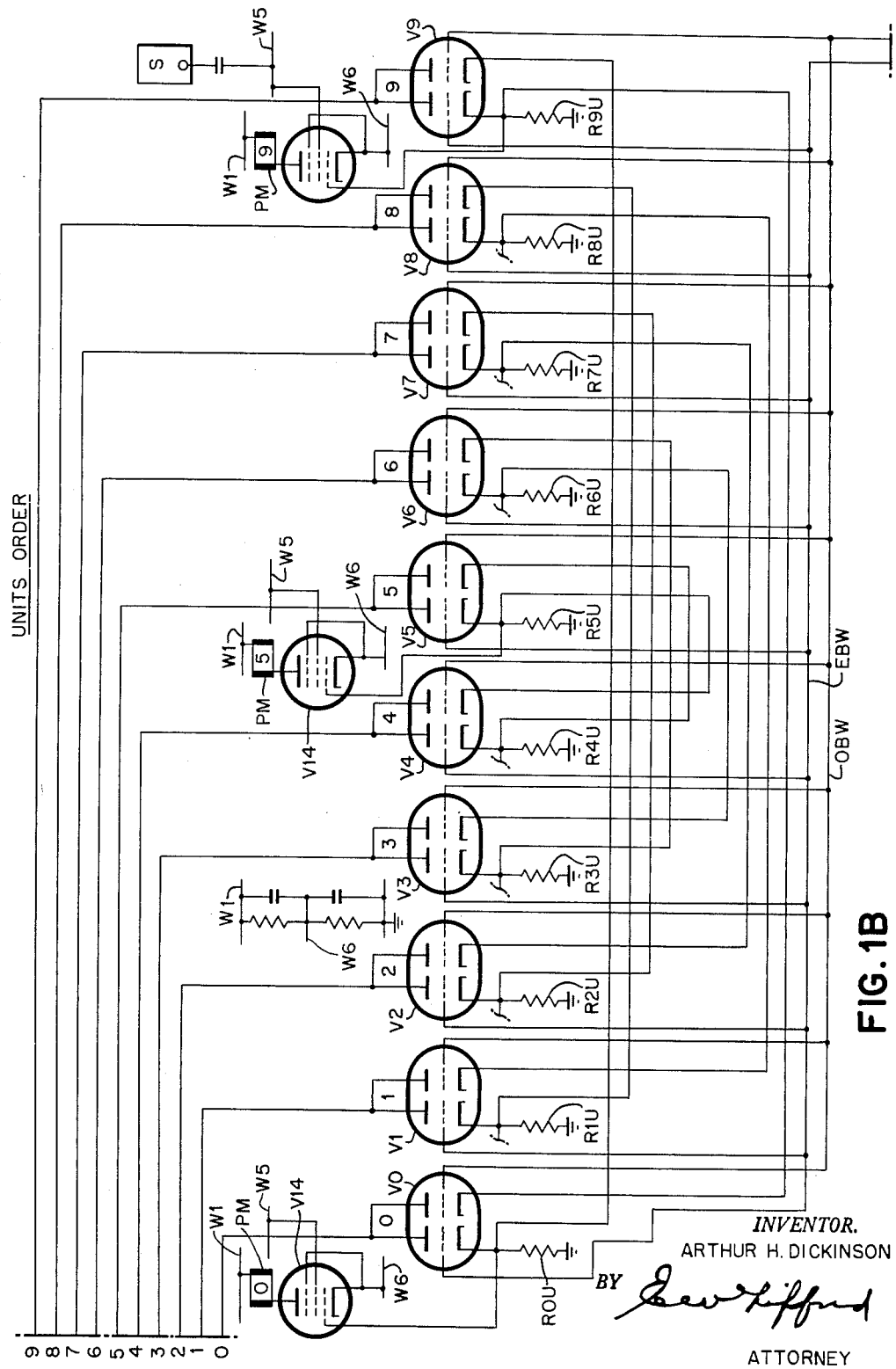

For the purpose of explaining the invention, it is shown in the drawings as applied to the measurement of rotary displacement of an element such as a shaft or other device, for example, to measure the rotation of a meter shaft. It will be understood, however, that the invention may be applied with equal facility to the measurement of linear movements in a manner which will be made clear hereinafter.

The invention includes means for sensing the displacement of the measured object which in the illustrative case includes a variably displaceable shaft 10 (Fig. 3) which might be a meter shaft, for example. Mounted on this shaft is a code disc 11 with which cooperates an optical system including the light source L, the slit S, the condensing lens CL, the projection lens PL, a masking plate MP, and a sensing head SH. The slit S is illuminated by the light source L and an image of the slit S is formed by the condensing lens CL on one face of the disc 11 near its periphery as a radial band of light which cooperates with masking areas or elements arranged in code form about the periphery of the disc 11 and on one of its faces. The image of the slit S formed in the plane of the disc 11 is imaged by the projection lens PL in a slit formed in the masking plate MP.

The masking plate MP is located so close to the sensing head SH that the image of the slit S is formed on the face of a row of fifteen phototransistors, five for each denominational order.

Figure 4:
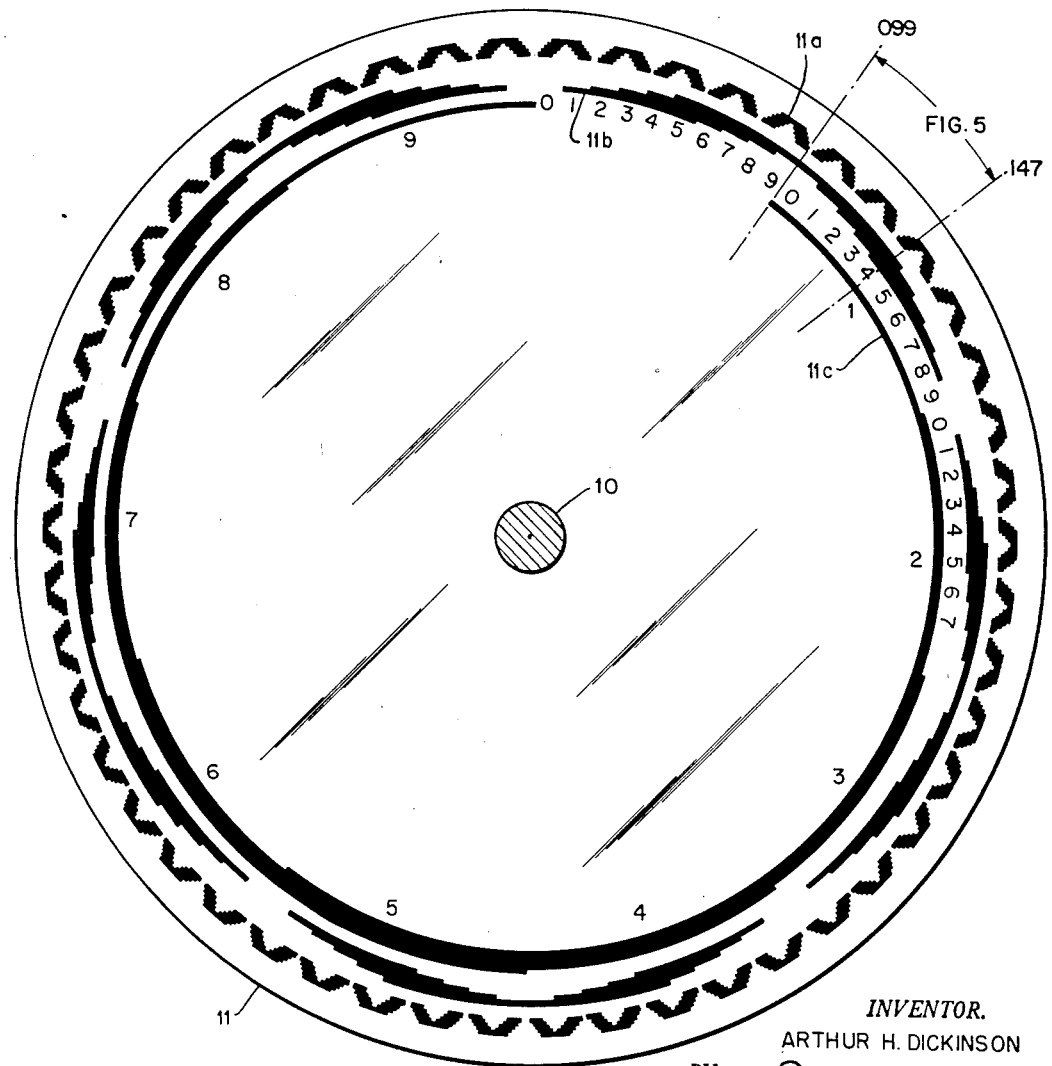
Fig. 4 is a large-scale view of the code dial which is used in cooperation with phototransistors sensing means to measure the displacement of the displaced object.

Illustratively, the disc 11 comprises a transparent medium on the face of which are printed, or in some other fashion formed, a masking code comprising masking elements of opaque material. There are three sets of basically similar masking elements arranged concentrically near the periphery of the disc 11, as shown in Fig. 4. For the purpose of explaining the operation of the conversion circuits and associated elements, it will be assumed that the shaft 10 will be limited to one full revolution as its maximum deflection in the process of measuring a value and that this is further subdivided into one thousand parts or increments of movement. On a digital basis the rotation of shaft 10 will range from "000" to "999" and for the purpose of representing this range of values digitally it will be necessary to have a register comprising three denominational orders. The basic masking element comprises two digital ranges from 0 to 0 and back to 0, making use of a code which for the initial range of digits, basically is the exact reverse of the next succeeding range of digits. Because of the fact that it requires three orders in this case for a complete digital representation of all values of displacement up to one full revolution of the shaft 10, there are three sets of basic masking elements and the codal arrangement of the opaque masking areas is identical in all three orders.

Figure 5:
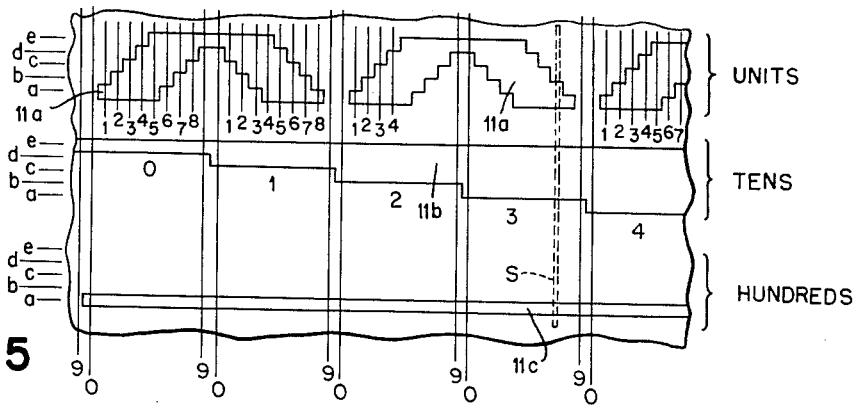
Fig. 5 is a large-scale developed view of a portion of the code dial showing the coded arrangement of the masking means on a digital basis.

The basic masking element for the units order is designated 11a (Figs. 4 and 5) and is shown on a large scale in Fig. 5.

This masking element 11a comprises a codal arrangement of elemental masking areas in which the code has an ascending degree of progressively masking a series of phototransistors followed by a progressive unmasking of the phototransistors to complete an initial series representing the digits 0 to 9 and a second codal arrangement for a second series of digits 0 to 9 in which the masking and unmasking sequence is reversed according to a system in which the codal arrangement of the masking areas in the second series is the nines complement of the second series in respect to identities in the code. Thus, for example, the code arrangement for the digit "5" in the first series is the same as the code arrangement for "4" in the second series and "4" is the nines complement of "5." Since "0" is the nines complement of "9," these digits are represented by the same masking element in the transitions from the initial code series to the complemental code series.

As best illustrated in Fig. 5 for the range of indicated values 099 to 147, there is a units order masking element 11a covering the range of digits 0, 1, . . . 9, 0, 1, 2, 3, . . . 9, 0 corresponding to the digits 0, 1 in the tens order. In other words there is a single units order masking element 11a for each pair of values 0–1, 2–3, 4–5, 6–7, 8–9 in the tens order. The second "9" in each range of two digits in the units order is not masked so that there are two successive clear portions between each element 11a and the next which represent "9" and "0" respectively. Furthermore, there are two successive opaque portions in each element 11a which also represent "9" and "0" for a purpose more fully explained hereinafter.

There are fifty units order masking elements 11a arranged about the periphery of the disc 11 to cover all possible digital positions in the units order. Each masking element 11a covers the span of twenty digits. There are also provided five tens order masking elements 11b similar to the elements 11a which are arranged the same as the elements 11a, but are spread over the periphery of the disc so as to cover all possible representations in the tens order. There is a single hundreds masking element 11c which extends over nine-tenths of the periphery of the disc (Fig. 4) to cover the hundreds digits.

Since the rotation of the shaft 10 is subdivided into 1,000 increments, the element 11c has only one initial range. If the subdivision had been 2,000 parts, then the number of elements 11a, 11b would be doubled and the second complemental range added for element 11c.

As will be seen in the enlarged view in Fig. 5, the opaque areas of the elements 11a are arranged in a stepped form which may be visualized as rectangularly blocked code areas across which the image of the slit S appears so that the light is increasingly blocked in a stepped form of code which ranges from complete transparency at "0" to a single blocked area for "1," two blocked areas for "2," three areas for "3," four areas for "4" and five areas for "5." At this point the mask is arranged so that the disc 11 becomes transparent in inverse relation to the blocking, so that at "6" the area which was blocked at "1" is exposed, and, similarly, there is a progressive exposure until the value "9" is reached.

Referring to Fig. 5, it will be noted that there is a progressive blocking of the areas a to e, in the order of the letters, to represent the digits 1 to 5 followed by a progressive unblocking in the same sequence a to e for the remaining digits 6 to 9 of the first series of digits. Next there is a progressive blocking in the reverse direction e, d, c, b, a for the digits 0 to 4 in the second sequence. This is followed by a progressive unblocking in the same reversed sequence until "9" is represented by a clear area. The code significance of the blocked areas in the second series is different from the first series according to the nines complements of the digits. Thus, "1" in the first series has the same code arrangement as "8" in the second series, "2," as "7," "3" as "6," etc. which are the nines complements of each other.

The blocked areas or code positions may be designated with the letters a to e in Fig. 5 for the respective masking elements and the slit S as shown in dotted lines in Fig. 5 is made long enough to span all three sets of masking elements and narrow enough so that it is less than the width of one step. Thus, the light through the slit S is varied positionally according to the disposition of the steps of the masking elements on the disc.

For the purpose of sensing the displacements of the disc 11, the sensing head SH is provided with three groups of phototransistors designated with the letters U, T, and H in Fig. 3, referring respectively to the units, tens, and hundreds orders or positions. There are five phototransistors in each group and they are arranged so that the windows of the phototransistors correspond to the blocked areas spanned by the slit S, and in Fig. 3 the letters a to e correspond in position to the masked positions a to e in Fig. 5. Thus, in Fig. 5, the slit S is shown as spanning the masked areas which represent the value 137 blocking off the a, b phototransistors in the units order; the b, c, d, e transistors for the tens order; and the a transistor for the hundreds order.

It will be noted in Fig. 5 for that part of the masking element 11b which covers the displacement of disc 11 from 99 to 100, there is no change in the e phototransistor for the tens order, but at "0" of this range the masking area 11c additionally blocks the a phototransistor in the hundreds group. The purpose of this arrangement is to cause only one change to take place in the codal arrangement for all three orders when the rotation of the disc 11 carries it through any zero position, be it in the units, tens or hundreds position, and is for the purpose of preventing the anomalous or ambiguous indications which are found in all kinds of instruments which employ the intercoupled trains of gearing for representing digitally continuous displacement of some kind. The reason for these ambiguous designations is that there frequently is required a carry upon a carry whenever an order goes through zero. For example, if the meter dials represent 999, the change to 1,000 by adding an increment requires initial carry in the units order, followed successively by carries in the tens and hundreds orders to bring the dial register to zero. Because of the fact that these transitional movements in various kinds of linear and rotational measuring devices are so slight in the higher denominational orders, it is quite difficult to see this slight change in a visual indicating instrument and errors in interpretation are quite frequently produced in translating the readings. Normally in registers of the digital type used in electronic or mechanical calculators the carries take place from the units order to the highest order by a snap action carry operation of some kind. In the present case, however, due to the novel arrangement of the codal masking elements 11a, 11b, 11c, the higher orders exercise the control on the entry in the register which is made with each measurement of the displacement of the dial. This will be made more clearly apparent by the discussion of actual examples in connection with the wiring diagram.

Figs. 1A, 1C and 1E show the manner in which the phototransistors and their associated amplifiers and inverters are arranged in conjunction with multicollector transistors to convert the displacements of the disc 11 into register entries which are digitally and denominationally properly related to the net displacement of the disc 11. For each order there is provided a series of five code sensing stages ST1 to ST5 having the phototransistors designated PT1 to PT5, and the masking code areas *a* to *e* in Figs. 3, 4, and 5 are designated in Figs. 1A, 1C, and 1E by the small letters *a* to *e* with an arrow in juxtaposition to the phototransistors. Thus, the area *a* for the units order in Fig. 5 is sensed by the transistor PT1 in Fig. 1A, and the area *e* by the transistor PT5. Similarly, in the units and hundreds orders, the areas *a* to *e* are sensed by the transistors PT1 to PT5 in Figs. 1C and 1E, respectively. Associated with each phototransistor such as PT1, for example, is an amplifier V10 and an inverter V11. Associated with the tubes V10, V11 for each stage are the multicollector transistors T1, T2. Thus, a single stage associated with the sensing of one masking area or code position comprises a phototransistor such as PT1, two tubes V10, V11, and two transistors T1, T2. The emitters of the transistors T1, T2 are connected by wire W1 to a common potential source of suitable value which, through the transistors T1, T2, also provides the anode potential for the tubes V10, V11. The collectors of the phototransistors PT1 to PT5 and the grids of the tubes V10, V11 are connected to a suitable negative bias potential wire W2, while the cathodes of the tubes V10, V11 are connected to a potential source intermediate the wires W1, W2 so that the cathodes operate at a potential medial to the anodes of the grids of the tubes V10, V11. The collectors of the transistors T1, T2 are connected to the wires W3 which for purposes of identification are identified by the small numbers 0 to 9 inclusive. However, it will be understood that this numbering is primarily for identification, as the wires only partly indicate the digital significance of the masked areas on the disc 11 for any given displacement of the disc.

Figure 1F:
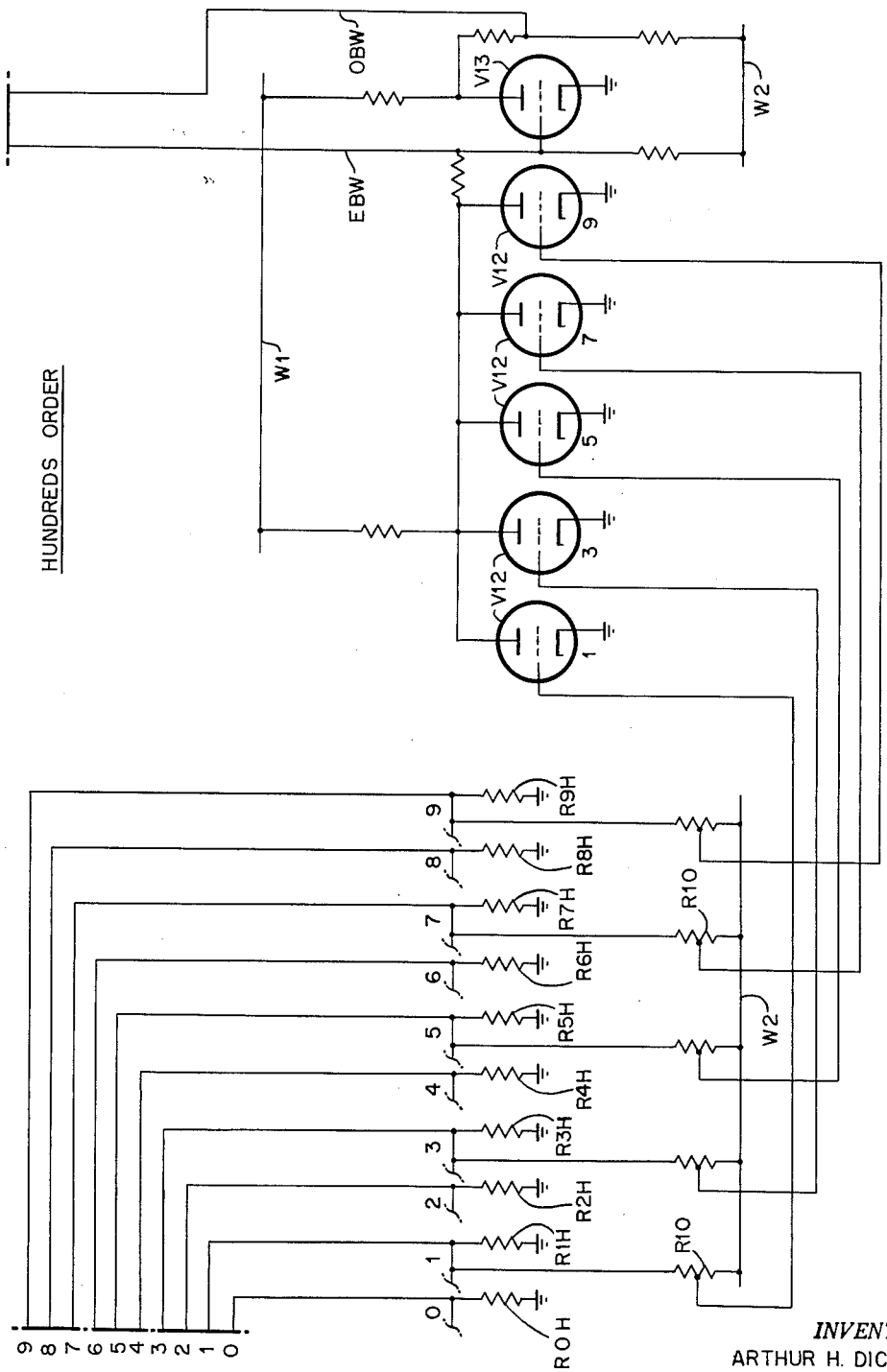

With reference to Figs. 1B, 1D, and 1F, it will be noted that the wires W3 are connected to the anodes of the register tubes V0 to V9 in the case of the units and tens order, and to the digitally representative load resistors R0H to R9H which control the readout tubes V14 of which there are ten for each order of the register, only three being shown in Fig. 1B.

It will be noted in Fig. 1B that each of the tubes V0 to V9 consists of a dual triode of which the left-hand triode is provided with a cathode follower load resistor, these resistors being designated R0U to R9U for the units order and R0T to R9T for the tens order to correspond with the load resistors R0H to R9H for the hundreds order. The right-hand triodes of each tube V0 to V9 are cross-coupled through their cathodes to the left-hand load resistor for that tube on the right or left which, in terms of its numerical suffix represents the nines complement of the digit. For example, the cathodes for the left-hand triode of tube V0 and the right-hand triode of tube V9 are connected in common to the R0U load resistor. It will also be noted that the left-hand grids of the tubes V0 to V9 (Fig. 1B) of the units order, for example, are connected to the odd bias wire OBW and the right-hand grids to the even bias wire EBW which are controlled by the bias gate V13 of the tens order (Fig. 1D). In other words, there is a pair of bias wires EBW, OBW for both the units and the tens orders. The purpose of this arrangement is to enable the hundreds order to control the register representations of the tens order, and the tens order to control the representations of the units order, instead of providing carry circuits between the units order to the tens order and the tens order to the hundreds order, respectively.

In Figs. 1B and 1D only one triode of the tubes V0 to V9 can be conductive at any one time, depending on which of the wires EBW, OBW is at an elevated potential. When the tubes V13 are conductive, the anode potentials will be low and the bias wires OBW will be held at low potential, thus cutting off the right-hand triodes of all of the tubes V0 in the affected order; whereas, as will be seen later, under these conditions the potential on wires EBW will be high and condition the left-hand triodes V0 to V9 for conduction. In the units order, for example, whether the right- or left-hand triodes of tubes V0 to V9 are primed for conduction will depend upon whether an odd value or an even value is represented by the tens order and, similarly, the representation of the tens order will depend upon whether or not the hundreds order is odd or even. As will be seen hereinafter, this arrangement makes it possible to set up an indication or representation of a multi-digit value in the register in consequence of a single change occurring in some one order rather than making the value representations dependent upon a succession of carry operations.

The operation of the circuits and sensing devices will now be described in detail with reference to specific examples. It will be noted in Figs. 4 and 5 that in the initial zero position of each range of the masking elements 11*a*, 11*b*, 11*c* all of the phototransistors PT1 to PT5 corresponding to a group of the masking element areas *a* to *e* will be energized by light because, in the initial zero position, there are no opaque portions of the masking elements registering with the slit S. Thus, when disc 11 is in zero position, all phototransistors PT1 to PT5 in all orders will be fully conductive and maximum current will flow in the circuits which include the bias resistors of the tubes V10. Thus, the potentials of the grids of the tubes V10 will rise sufficiently to cause these amplifiers to conduct. This causes the anode potential of the tubes V10 to drop and cut off the tubes V11 and the anode potentials of the tubes V11 will rise high enough to prevent the transistors T2 from conducting a maximum. Due to the small drop in potential in the tubes V10, the base potentials of the transistors T1 is lowered sufficiently to cause them to conduct a maximum in their collector circuits.

It will be noted in Fig. 1A that the zero wire W3 is the only one which is connected to two transistors T1 which are conducting simultaneously to the maximum extent. All of the other wires are so connected that each involves one fully conducting transistor and one which is conducting a minimum. Thus, only the tube V0 in Fig. 1B will have its anode potential elevated sufficiently to make one or the other of the two triodes conductive when either grid is at the proper potential. The same situation will be true in Figs. 1C and 1D, and in Figs. 1E and 1F due to the fact that the two transistors T1 associated with phototransistors PT1, PT5 for the tens and hundreds orders are both conducting simultaneously to the maximum extent and causes maximum current to flow through the resistors R0T (Fig. 1D) and R0H (Fig. 1F) thus producing maximum voltage drop in these resistors. All of the remaining resistors R1T to R9T and R1H to R9H are conducting current at an intermediate value because of the fact that all of the transistors T1 are conductive. Thus, the tubes V12 in Fig. 1F, the grids of which are controlled by the voltage drops across cathode follower resistors R1H, R3H, R5H, R7H, R9H, will remain cut off and the potential on the anodes thereof will remain high, placing the even bias wire EBW at the highest potential, zero being considered as an even value. Since under these conditions the tube V13 (Fig. 1F) will be caused to conduct, the wire OBW will be held at a low potential.

It will be noted in Fig. 1D that the grids of the left-hand triodes of tubes V0 to V9 are connected to the even bias wire EBW and, since this is now at an elevated potential, all of the left-hand triodes will be primed for conduction. However, only the tube V0 has its anode potential at a sufficiently elevated value to cause this tube to conduct. None of the other tubes V1 to V9 will be completely primed for conduction and the cathodes thereof will be maintained at the potential of the grid bias wire W2 and keep the tubes V12 for the tens order nonconductive. Thus, the tens order tubes V12 are held at cut-off, tube V13 conducts, the wire EBW for the units order remains high, and the corresponding wire OBW remains low.

The same situation exists in Fig. 1B with respect to the units order with the result that only the tube V0 in the units order is conductive on the left-hand side. Thus, the digit "0" is represented in each of the three orders by the fact that the tubes V0 are all conductive and produces a large drop through the resistors R0U, R0T, R0H.

Associated with each of the tubes V0 to V9 in Figs. 1B and 1D and with the resistors R0H to R9H in Fig. 1F is a readout tube V14, the control grids of which are connected to the left-hand cathodes of the tubes V0 to V9. The cathodes of tubes V14 are connected to wire W6 so as to be normally maintained at a potential high enough above the ground potential to keep the readout tubes at cut-off. When a readout pulse is applied to all of the screen grids of the tubes V14 over wire W5 from a suitable timed source S (Fig. 1B), only the tubes V14 corresponding to zero, in the illustrative example just described, will be rendered conductive and cause the energization of a zero magnet PM for each order of the register which may be utilized in some convenient fashion to punch, print, or otherwise control a data recording device. For example, the magnets PM could be solenoids actuating the keys of a three-row keyboard adding machine.

Now let it be assumed that a displacement of the dial 11 takes place to indicate the value "005." Since the tens and hundreds orders are still at zero, the wires EBW in Figs. 1D and 1F will remain at elevated potential. With reference to Fig. 5, it will be noted that the value "5" in the initial sequence of digits is represented by the fact that all of the phototransistors PT1 to PT5 are masked. Thus, none are fully conductive in Fig. 1A and the tubes V10 will all be cut off, thereby raising the base potential of the transistors T1 to cause them to conduct a minimum. All of the transistors T2, however, will be rendered conductive because of the grids of the tubes V11 are now sufficiently positive to cause the tubes V11 to conduct and increase the voltage drop in the emitter-base circuits of the transistors T2. It will be noted in Fig. 1A that only the "5" wire W3 is connected to two transistors T2 which are fully conductive. All of the others are connected in each case to a transistor T1 and a transistor T2 so that maximum current flow can occur only through the "5" wire. Now in reference to Fig. 1B, it will be noted that the "5" wire is connected to the anodes of the tube V5. Since only the wire EBW is at high potential, the left-hand triode of tube V5 is fully primed for conduction and the "5" tube V14 will be rendered operative, as described above, to cause the recording or representation of the digit "5." None of the other tubes V0 to V4 and V6 to V9 will be at a sufficiently elevated anode potential to enable them to conduct and the value "005" will be recorded, only the zero magnets V0 being affected in the tens and hundreds orders, as in the example first discussed.

If the disc 11 is now displaced to the value "008," it will be noted that only the $d$ and $e$ areas remain masked and the phototransistors PT4, PT5 (Fig. 1A) will be cut off and phototransistors PT1, PT2, PT3 will conduct a maximum. Transistors T2 corresponding to stages ST4, ST5 and transistors T1 for stages ST1 to ST3 are fully conductive. Inspection of the wires W3 discloses that the "8" wire is the only one that is connected to the two transistors which are fully conductive, that is, T1 for stage ST3 and T2 for stage ST4. Thus, the tube V8 in Fig. 1B is the only one conditioned for conduction on the left-hand side, as described above, and the value "008" will be recorded.

It will be noted in Fig. 5 with respect to the extreme left-hand element 11$a$, that, after "9" of the initial range of digits is passed and "0" is encountered again, which would require a carry in an ordinary register, the $e$ area corresponding to phototransistors PT5 remains masked.

In Fig. 4, with respect to the range of displacement of disc 11 covered by Fig. 5, the element 11$b$ is in the second range of digits and the transition from "099" to "100" is marked by the fact that element 11$c$ becomes effective to block the phototransistor PT1 (area $a$) in Fig. 1E by commencing its first range of digits. In the transition from "109" to "110," the element 11$b$ additionally masks area $d$ to block phototransistor PT4 in the tens order. In the transitions from "119" to "120," "129" to "130," and "139" to "140," the phototransistors PT3, PT2, PT1, respectively, are additionally masked. The points where the digits "9" and "0" are represented by blocking of the phototransistors PT5 might be called the "humps" in the masking code and the points where the same digits are represented by masking the phototransistors PT1 may be called the "valleys" by analogy to the wave forms of transverse energy waves. On this basis the odd value transitions take place at the humps and the even value transitions take place at the valleys. Thus, in Fig. 5 the humps of the elements 11$a$ correspond to the odd transitions "1" and "3" and the valleys to the even transitions "0," "2," and "4." Likewise the long valley in element 11$c$, which spans five of the elements 11$a$ (Fig. 4) and half of an element 11$b$ has the odd valued steps "1," "3," "5," etc., coinciding with the humps of elements 11$b$ and the even valued steps coinciding with the valleys of elements 11$b$. In no case, however, do two transitions occur together. The control effected by the transitions in higher orders over lower orders differentiates not only the digits "9" and "0" but also the reversals in code significance necessary when the masking elements are operative in the second range of digits.

In order to illustrate the effect of this control by the higher order over the next lower order, let it be assumed that the value "120" is indicated by the disc 11. In this case the slit S will occupy a position indicated by the third zero line from the left in Fig. 5. The representation, in the highest order, is an odd value in the first range of digits and, in the tens order, an even value in the second range of the two sequences of digits "0" to "9" covered by the masking elements. Thus, the $a$ area of the disc 11 for the hundreds order and the $c$, $d$, and $e$ areas of the tens order mask the phototransistors PT1 in the hundreds order; PT3, PT4, and PT5 in the tens order; and none in the units order. With reference to Figs. 1E and 1F, the phototransistor PT1 is blocked, cutting off tube V10 and causing tube V11 to conduct. Thus, transistor T1 for stage ST1 is cut off and transistor T2 conducting a maximum. The remaining transistors T1 are fully conductive because their associated phototransistors PT2 to PT5 are conducting a maximum.

In this case only the "1" wire W3 has the transistor T2 for stage ST1 and T1 for stage ST2 fully conductive. A maximum drop occurs across the resistor R1H in Fig. 1F, thus raising the grid potential of the extreme left-hand tube V12 sufficiently to cause it to conduct. The operating conditions of the tubes V12 are such that when any one is conductive, the anode potential of all will be dropped sufficiently to cut off tube V13. This causes the odd bias wire OBW to rise in potential and the even bias wire EBW to drop and the odd-numbered tens order tubes V1, V3, etc., in Fig. 1D will be primed for conduction.

Since the tens order masking element 11$b$ now blocks the $c$, $d$, and $e$ areas, it being in the second series of digits, the phototransistors PT3, PT4, PT5 are cut off and PT1, PT2 fully conductive. This makes the transistors T2 for stages ST3, ST4, ST5 and the transistors T1 for stages ST1, ST2 conductive a maximum. It will be noted that in this case only the "7" wire W3 in the tens order (Fig. 1C) is connected to two transistors which are conducting a maximum, transistor T2 for stage ST3 and transistor T1 for stage ST2. Thus the tens order tube V7 (Fig. 1D) is potentially conductive on the anode. However, since the hundreds order indicates an odd value and the odd bias wire OBW is now at high potential in Fig. 1D, only the right-hand triode of tube V7 is rendered conductive in this case. This causes a flow of current from the right-hand cathode of tube V7 through the cathode follower resistor R2T and raises the potential of the left-hand cathode of tube V2 high enough to render the associated "2" readout tube V14 effective in the manner described above with the result that the value "2" will be recorded, in spite of the fact that the tens order, in terms of representation by means of the tubes V0 to V9, actually designates "7" which is the nines complement of "2."

It will be seen that, when a selected order is operating in accordance with the code for the second range of digits as determined by a masking element such as 11b, and the next highest order is odd in value, the complement of the value designated in the selected order will be recorded.

Since the value actually recorded is even, none of the tubes V12 for the tens order are rendered conductive and the units order even bias wire EBW remains at high potential. In the units order, a zero will be represented and recorded exactly as in the first case discussed above since all of the phototransistors PT1 to PT5 will be activated and the even bias wire EBW is high.

It will be noted that there is no apparent differentiation between "0" and "9" in the code, either at the humps or in the valleys of the code. In the case just discussed suppose the indication had been "119" instead of "120." The tens order will record "1" because the highest order will be odd and in the tens order only the areas d and e now will be masked causing transistors T1 for stages ST1 to ST3 and transistors T2 for stages ST4, ST5 to conduct a maximum. This selects the "8" wire W3, the right-hand triode of tube V8 will be activated, and resistor R1T selected. This also cuts off the "1" tube V12, lowering the potential of wire EBW and raising the potential of odd bias wire OBW. As before the "0" wire W3 will be selected in the units order (Fig. 1A) and tube V0 partly activated. Only the right-hand triode will conduct in this case to produce a potential across resistor R9U. This activates the "9" readout tube V14 and a "9" will be recorded.

In order to illustrate the effect for the humps let it be assumed that the disc 11 registers 129. Except for the units order, the situation is the same as for the case described above in reference to the indication "120." The even bias wire EBW is now high in the units order and phototransistors PT1 to PT4 energized. The transistors T1 for stages ST1 to ST4 and transistors T2 for stage ST5 are fully conductive. The "9" wire W3 will be selected by the transistors T1 of stage ST4 and T2 of stage ST5, activating the tube V9. Since wire EBW is high, the right-hand triode of tube V9 will be conductive and record "9."

If the disc 11 is now displaced to "130," the tens order becomes odd, the potential on wire OBW goes high, the right-hand triode of tube V9 will conduct, and resistor R0U rendered effective. This will cause a "0" to be recorded.

It will be noted on examination of Figs. 4 and 5 that in the transitions through zero in all cases there is only one change produced in any order. This principle holds true even when a double carry operation normally would be required as, for example, from "199" to "200." It will be noted in Fig. 5 that the zero changes or "carries" take place at two points in each of the masking elements 11a, 11b, at one point where there are two successive clear portions, at the initial zero position, and the two successive opaque portions, where the second series of digits commences. At each of these points there is only one single step change in any single case by any of the steps of the masking elements 11a, 11b, 11c. This result is obtained by the code reversal which takes place between the "9" of the first series of digits which are always associated with an even value in the next higher order and the zero of the second series of digits which are always associated with an odd value. It will be noted that in Fig. 5 the code roughly resembles a sine wave in general outline due to the shape of the masking areas which, in the range of two successive digits in any single order, have a strong resemblance to a sine wave loop so that the masking code may, in a sense, be termed an oscillating code, and the maxima points in any of the masking elements do not coincide in a direction radially of shaft 10. Putting it in another way, the codal arrangement on the disc might be compared to a fundamental wave and its tenth and hundredth harmonics, respectively, with all of the harmonics out of phase with each other and with the fundamental, so that neither the maxima nor the minima portions of the curves coincide at any point.

In order to simplify the disclosure of the invention, it has been described in connection with the displacement of a shaft which has been limited to 360°. The masking elements 11a, 11b, 11c may, however, be placed on discs or other elements which are separately movable to designate measured values without altering the circuit or the arrangement of the denominational groups of phototransistors. For example, the pointers of a watthour meter might be replaced by discs having the sets of elements 11a, 11b, 11c on the units, tens and hundreds order shafts.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only by the scope of the following claims.

What is claimed is:

1. In an analogue computer, a register having a plurality of denominational orders, each order having value representing elements capable of being made operative to represent the values of a number system, entry means for making said elements operative to represent values and selectively conditionable to make said elements operable to represent both values and complements of values, and means in each higher order for selectively conditioning the first means for the next lower order to make the value representing elements for such order represent the complement when the next higher order represents odd values.

2. In an analogue computer, a register having a plurality of orders, means for making both direct entries of values in said orders and the complement of said values including selectable means in each lower order for determining whether a direct value or a complement will be entered in such order, and means in each higher order for selectively controlling the determining means of the next lower order according to whether an odd value or an even value has been entered in the higher order.

3. In an analogue computer, an element displaceable to represent any one of a plurality of values requiring several denomination orders of value representing means; a code member actuated by said element and having a plurality of series of coded value representations, each coded series of value representations comprising sequences of representations coded to represent a range of values of a number system alternatively with sequences of representations coded to represent the complements of such range of values; value designating means comprising a separate series of value designating elements for each of said orders capable of being made operative to represent any one of said range of values, means for sensing the value representations, entry means rendered effective by the sensing means for making the value designating elements operative to designate the values and their complements represented by the alternate sequences of value representations, including means to set the entry means to designate the complement of a value represented by the complement sequence and means rendered effective when a higher order designates an odd value of said range for setting the entry means to designate the complement.

4. In an analogue computer, an electronic register having a plurality of series of dual triode value designating tubes; each tube in a series designating one of the component values of a number system, each triode having two separate cathode follower circuits coupled to the cathodes of another triode of the same series designating the complement of said one of the component values, two separate bias sources for the grids of each series of tubes, one of the grids of each tube being connected to one of the sources and the other grid of the same tube to the other bias source; means for selectively applying anode potentials to said tubes to select one for conduction to designate a component value, and bias controlling circuits for each series of tubes and rendered operative by one of the cathode coupling circuits for the tubes designating odd values for selectively changing the bias from said sources with respect to the tubes in the next lower order.

5. In an analogue computer, an electronic register comprising a plurality of orders, each order including a series of load resistors designating the component values by means of voltage drops across said resistors, a series of pairs of electronic translating devices, each pair representing a component value, each device having a control element, an input element, and an output element, one of the output elements of each pair being connected to the load resistor designating the component value represented by said pair and to one of the output elements of the pair designating the complement of the same value, and the other output element of the first named pair being connected to the load resistor designating the complement and to the remaining output element of the complementary pair, whereby each load resistor designating a component value is controlled by two translating devices, one for the designated component value and the other for the complement of such value; two separate bias controlling sources, one for the true component values and the other for the complements of the component values, the control elements associated with said one output elements being connected in common to the even bias source and the control elements associated with said other output elements being connected to the odd bias wire; a bias controlling circuit for each series of load resistors responsive to voltage drops across the resistors designating odd values and selectively controlling the bias sources for the next lower order to render the translating devices for each order conductive or nonconductive according to whether an odd value or an even value is designated in the next higher order; and means for selectively applying activating potentials representing component values or their complements to the input elements of said devices.

6. In an analogue computer, a member displaced variable extents in measuring values covering a range of digits, a code element actuated by said member and having a first series of code representations arranged in alternating sequences, one sequence representing a range of true numbers and the alternating sequence representing by the same code the complements of the true numbers, said element also having a second series of code representations differentiating the true number representations from the complement representations, a series of register elements capable of being made operative to designate the true values, means to selectively condition said elements under control of the first series of representations, including selectively setable means for determining whether said register elements are to be conditioned directly under control of the true number code representations or conditioned complementarily under control of the complement code representations; and means controlled by the second named series of code representations for selectively setting the settable means to cause the register elements to be conditioned to designate the complement of the complementary values represented by the alternate sequences of code representations.

7. In an analogue computer, an element displaced variable extents over a range of values including a maximum of a plurality of denominational order, a code member actuated by said element and bearing a plurality of series of basic code representations, one series for each order, each series having a basic code group comprising a true number code sequence and a complement code sequence in which the true number code sequence also represents the complements of the true numbers, the basic code groups for the several orders being physically expanded selective to the next lower order and spaced so that the code representations for the odd values in any one order are associated only with the complementary code sequences of the next lower order, a register having as many orders as there are series of code representations, means controlled by the code representations for entering in the register the actual values represented by the code representations whether true numbers or complements thereof, and means rendered effective by the registering of an odd value in each higher order for causing the entering means for the next lower order to enter the complement of a complementary value.

8. In an analogue computer, a member displaceable to measure values in a complete range of the digits 0 to 9 and having a series of code representations of said digits in which combinations of code designations in a plurality of code positions, less in number than the number of digits in the range; a series of photosensitive devices, one for each code position for sensing said representations; a series of amplifiers, one for each device, a series of inverters each controlled by one of said amplifiers, a series of output wires representing the digits 0 to 9; a series of semiconductor translating devices, one for each amplifier and inverter, each having a pair of collectors, the pairs of collectors for the translating devices corresponding to the amplifiers being connected to the digit wires on the basis 0 and 6, 1 and 7, 2 and 8, 3 and 9, 0 and 4, and the pairs of collectors for the associated inverters being connected to said wires on the basis 1 and 5, 2 and 6, 3 and 7, 4 and 8, 5 and 9; and a series of resistive loads, one for each digit wire across which potential drops representative of digits are selectively produced in accordance with the different combinations of conductivity of said semiconductor translating devices in response to said code representations.

9. In an analogue computer, an electronic register comprising a plurality of orders, each order having a series of load resistors for designating digital values, a series of pairs of three electrode translating devices, each device corresponding to one of said values, a first electrode of each pair being connected in common for selective application of digit representing activating potentials, one second electrode of each pair of devices being connected to the load resistor representing the same digital value and also to one second electrode of the pair of devices corresponding to the complement of such value, the other second electrode of each pair being connected to the load resistor and second electrode corresponding to the complement, whereby each load resistor representing a digital value is coupled to a second electrode of both a translating device representing a digit and a second electrode of the translating device representing the complement of the same digit, a pair of potential sources for each series of devices, for rendering said devices conductive, one for true numbers and the other for complements, the third electrodes of each pair of devices being connected, each to one of said pair of potential sources; and circuit means connected to the resistors designating odd values for rendering operative the odd potential source of the next lower order effective when a potential drop occurs across any odd value representing resistor.

10. In an analogue computer, a series of potential sources representing the digits 0 to 9, means for rendering a selected one of said sources effective to represent a digit, a register having a series of load resistors representing digits, two series of thermionic translating devices, each having an anode, a control electrode and a cathode, one series representing the digits 0 to 9 and having its anodes connected to said potential sources, its cathodes connected to said load resistors, and its control electrodes biased for conduction, the second series of devices representing complements of the digits 0 to 9 and having its anodes and cathodes connected to said sources and said resistors complementary and having its control grids biased for nonconduction whereby selective application of potential from one of said sources to one of the anodes of the first series of devices produces a voltage drop across the load resistor of corresponding digit value, and a bias controlling circuit for reversing the bias on said electrodes to cause the potential drop which would normally appear across a selected load resistor to appear across the load resistor corresponding to the complement.

11. In an analogue computer, a member displaceable variable extents in measuring values expressable in a plurality of orders of the decimal system and having a plurality of series of code representations, one series for each order, each lower order series having two different digital codes, said codes alternating, one for the odd digital values and the other for the even digital values in the next higher order, said codes being arranged so that only one change in code representation can take place in any change from one value representation to the next highest or lowest significant value representation; a register having a plurality of orders to correspond to the number of code series in said member, each order having a plurality of elements capable of being made operative to represent digit values; means to sense said code representations, and entry means rendered operative by the sensing means for making said elements operative to interpret said codes on a digital basis and selectively settable to make the elements in each order operative according to whether the next higher order of the register represents an odd or an even digital value, and means associated with each higher order for selectively setting the settable means of the next lower order according to whether the value represented in such higher order is odd or even.

12. In an analogue computer, a member displaceable to represent one of a range of values represented by a plurality of denominational orders, said members bearing a plurality of series of code representations, one series for each order, each series having two different codes for the same range of digits and alternating in arrangement, with one of the digit codes associated with the odd value digit code of the next higher order and the alternate code associated with the even valued code of the next higher order; a register having a denominational order to correspond to the number of series of code representations, each order having a group of elements conditionable to represent all of the digits represented by the codes, means for sensing said codes, means rendered operative by the sensing means for conditioning said elements to represent a digit according to said codes and selectively operable according to whether the code is odd or even and means in each higher order of the register for setting the conditioning means for the next lower order to respond to the odd code when such higher order is conditioned for an odd value and to respond to the even code when such order is conditioned for an even value.

13. In an analogue computer, an element displaceable variable extents to indicate a value expressable in a number system having a plurality of orders; value designating code means actuated by said element and representing successive values by a plurality of series of code representations, each series comprising alternating odd and even codes, the odd codes for a range of values of each order being associated with the code for a single odd value, and the alternate even codes for the same range of values being associated with the code for a single even value, in the code for the range of values represented by the next higher order; means for sensing said code representations, a plurality of series of value representing means, one series for each series of code representations, and conditionable to represent the coded values, means rendered effective by the sensing means for conditioning said representing means to represent values and operable in either of two ways according to which of two alternating odd or even codes is sensed, and means rendered operative by the conditioning of the representing means for a higher order in accordance with an odd or even code representation for rendering the next lower order conditioning means operable according to the odd or even code, respectively.

No references cited.